US007396282B2

(12) United States Patent
Gauselmann

(10) Patent No.: US 7,396,282 B2
(45) Date of Patent: Jul. 8, 2008

(54) SLANT TOP SLOT MACHINE WITH LEDS TO ILLUMINATE FRONT SURFACE

(75) Inventor: Michael Gauselmann, Espelkamp (DE)

(73) Assignee: Atronic International GmbH, Lübbecke (DE)

( * ) Notice: Subject to any disclaimer, the term of this patent is extended or adjusted under 35 U.S.C. 154(b) by 607 days.

(21) Appl. No.: 10/945,227

(22) Filed: Sep. 20, 2004

(65) Prior Publication Data

US 2006/0063591 A1 Mar. 23, 2006

(51) Int. Cl.
*A63F 13/02* (2006.01)

(52) U.S. Cl. ........................................... 463/46; 463/30

(58) Field of Classification Search ............. 463/30–34, 463/46–47

See application file for complete search history.

(56) References Cited

U.S. PATENT DOCUMENTS

D344,296 S 2/1994 McKay et al.
5,513,846 A * 5/1996 Niederlein et al. ...... 273/143 R
6,174,234 B1 * 1/2001 Seibert et al. ................. 463/20
2003/0013513 A1 * 1/2003 Rowe .......................... 463/20
2003/0109304 A1 * 6/2003 Gauselmann ................ 463/30
2004/0106450 A1 * 6/2004 Seelig et al. .................. 463/30
2004/0166932 A1 * 8/2004 Lam et al. ..................... 463/30

* cited by examiner

*Primary Examiner*—Scott E Jones
(74) *Attorney, Agent, or Firm*—Patent Law Group LLP; Brian D. Ogonowsky

(57) ABSTRACT

A slant top slot machine is described where a raised translucent or transparent housing for light emitting diodes (LEDs) surrounds the main display area of the machine. In the case of a video machine, the raised housing surrounds the video screen. Light from multicolored LEDs in the housing, when illuminated, is emitted downward from the sides of the raised housing to illuminate the front surface of the slant top surface. In one embodiment, the slant top surface is brushed stainless steel so that the LED light reflects off the stainless steel surface and reradiates the light outward toward the player. In an embodiment where the raised housing raises the video screen and the LEDs above the front surface, the screen is optically separated from the rest of the machine, and the player can more easily concentrate on the game since other features on the front surface appear to be in the background. The LED light also illuminates any player-control devices and other features on the front surface, allowing the ambient light to be lower.

21 Claims, 4 Drawing Sheets

SLANT TOP SLOT MACHINE WITH LEDS TO ILLUMINATE FRONT SURFACE

FIELD OF THE INVENTION

This invention relates to slot machines and, in particular, to a front surface illumination technique for such slot machines.

BACKGROUND

Slant top slot machines are designed for long term play. A typical slant top machine is generally shown in design patent Des. 344,296. A seat is provided in front of the machine, a cushioned railing is provided for the player to lean on, the main front face of the machine is slanted for easier viewing, the control buttons are typically on a slanted or horizontal surface for easy access when sitting, and the machine is much lower than a conventional upright slot machine. Slant top machines may be a video type or mechanical reel type.

Gaming machines known to the Applicant do not include any special illumination devices for illuminating the front surfaces of the machines. Illuminating the front surface of a gaming machine, especially a slant top machine, provides many functional advantages, as described herein.

SUMMARY

A slant top slot machine is described where a raised translucent or transparent housing for light emitting diodes (LEDs) surrounds the main display area of the machine. In the case of a video gaming machine, the raised housing surrounds the video screen.

Light from multicolored LEDs in the housing, when illuminated, is emitted downward from the sides of the raised housing to illuminate the surface of the slant top surface. In one embodiment, the slant top surface is brushed stainless steel so that the LED light diffusively reflects off the stainless steel surface toward the player.

By illuminating the surface of the slant top machine various functional advantages are achieved. The slant top machine illuminates itself, thus allowing the ambient light to be lower, creating a more pleasant playing atmosphere. The illumination also illuminates features on the front surface such as printed material, a keypad, the control buttons, a drink setting area, etc. The illumination also illuminates the area surrounding the machine such as the seat and floor.

In addition to the downward-emitted LED light illuminating the front surface of the slant top machine, the LEDs may also be controlled to convey information, such as to convey, by displaying a certain color, that the machine is in the same linked jackpot group as other machines or to convey aspects about the outcomes of games (such as winning outcomes).

Another advantage of a raised housing that raises the video screen and the LEDs above the front surface is that the screen is optically separated from the rest of the machine and seems to float above the surface. The player can more easily concentrate on the game since other features on the front surface appear to be in the background.

The invention can be implemented on upright gaming machines as well. The LEDs in the raised housing may completely surround or partially surround any type of gaming display, such as a window revealing motor-driven reels. Additional embodiments and advantages are described herein.

DETAILED DESCRIPTION

Although the invention can implemented in any type of gaming machine, one particular style of gaming machine, having a slant top, will be described in detail.

Figure 1:
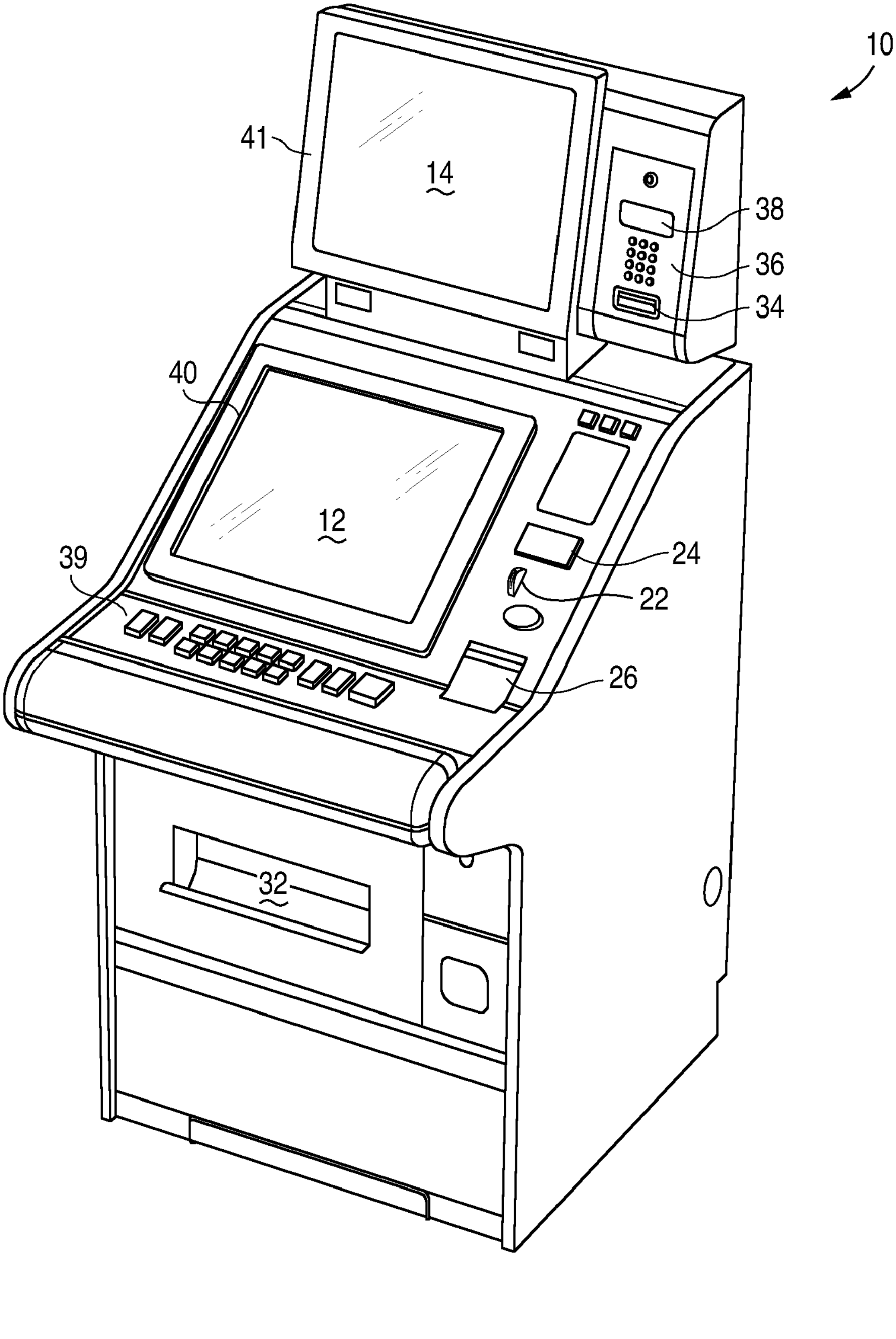
FIG. 1 is a perspective view of one example of a slant top video slot machine incorporating the illumination LEDs.

FIG. 1 is a perspective view of a slant top gaming machine 10 that incorporates the present invention. Machine 10 includes a display 12 that may be a thin film transistor (TFT) display, a liquid crystal display (LCD), a cathode ray tube (CRT), or any other type of display. A second display 14 provides game data or other information in addition to display 12. Display 14 may provide static information, such as an advertisement for the game, the rules of the game, pay tables, paylines, or other information, or may even display the main game or a bonus game along with display 12. Alternatively, the area for display 14 may be a display glass for conveying information about the game.

A coin slot 22 accepts coins or tokens in one or more denominations to generate credits within machine 10 for playing games. An input slot 24 for an optical reader and printer receives machine readable printed tickets and outputs printed tickets for use in cashless gaming. A bill acceptor 26 accepts various denominations of banknotes.

A coin tray 32 receives coins or tokens from a hopper upon a win or upon the player cashing out.

A card reader slot 34 accepts any of various types of cards, such as smart cards, magnetic strip cards, or other types of cards conveying machine readable information. The card reader reads the inserted card for player and credit information for cashless gaming. The card reader may also include an optical reader and printer for reading and printing coded barcodes and other information on a paper ticket.

A keypad 36 accepts player input, such as a personal identification number (PIN) or any other player information. A display 38 above keypad 36 displays a menu for instructions and other information and provides visual feedback of the keys pressed.

Player control buttons 39 include any buttons needed for the play of the particular game or games offered by machine 10 including, for example, a bet button, a repeat bet button, a play two-ways button, a spin reels button, a deal button, hold cards buttons, a draw button, a maximum bet button, a cash-out button, a display paylines button, a display payout tables button, select icon buttons, and any other suitable button. Buttons 39 may be replaced by a touch screen with virtual buttons.

Figure 2:
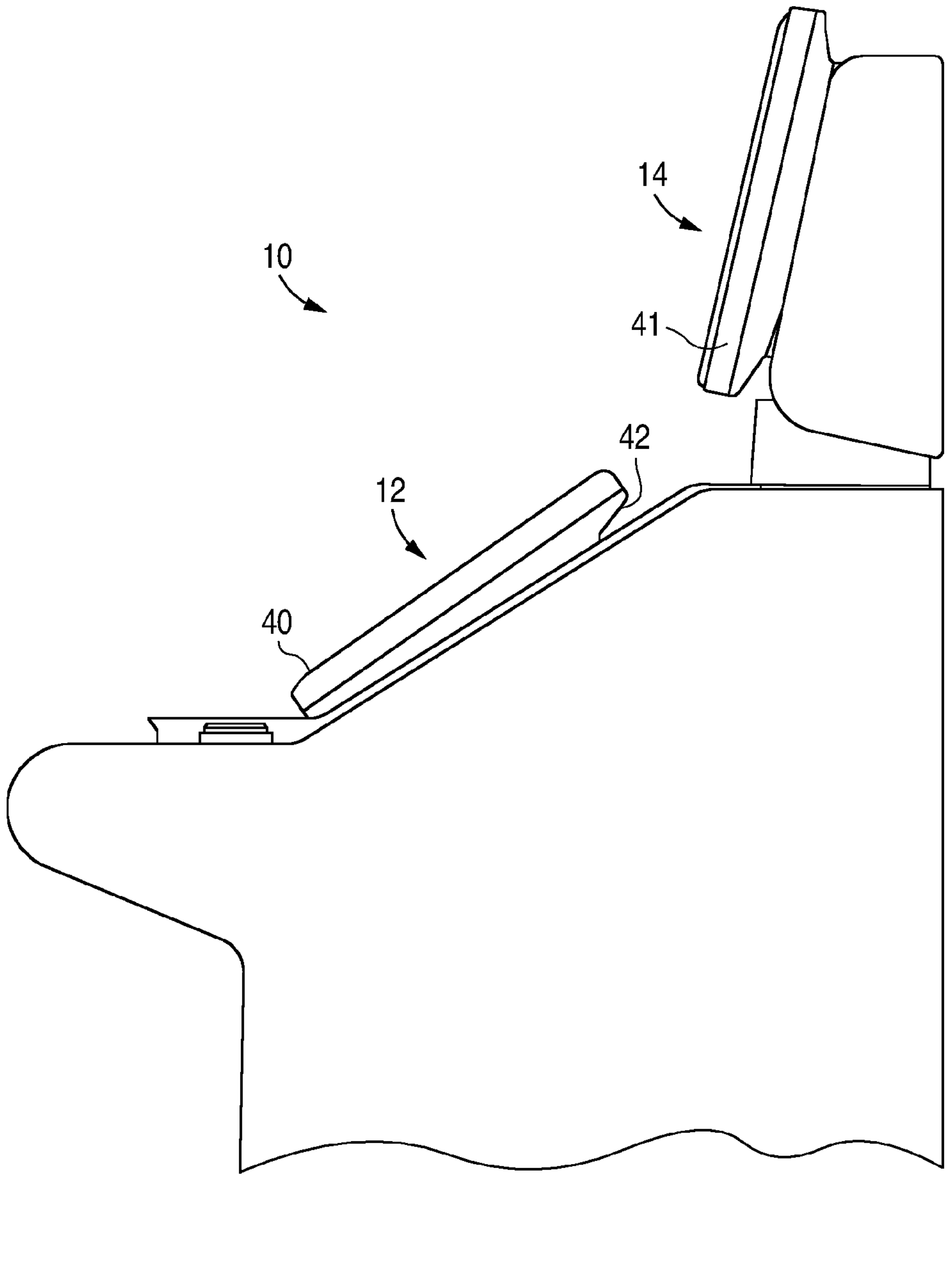
FIG. 2 is a side view of the machine of FIG. 1 showing the raised housing of the LEDs.

FIG. 2 is a side view of the machine 10. Surrounding displays 12 and 14 is a raised housing 40 and 41, respectively, for LEDs. If the displays used are flat panel displays, such as thin film transistor (TFT) displays, the flat panel display may be completely housed in the raised housing 40, 41. The raised housing 40, 41 may have a height above the mounting surface of 2 cm-10 cm or any other suitable height.

Figure 3:
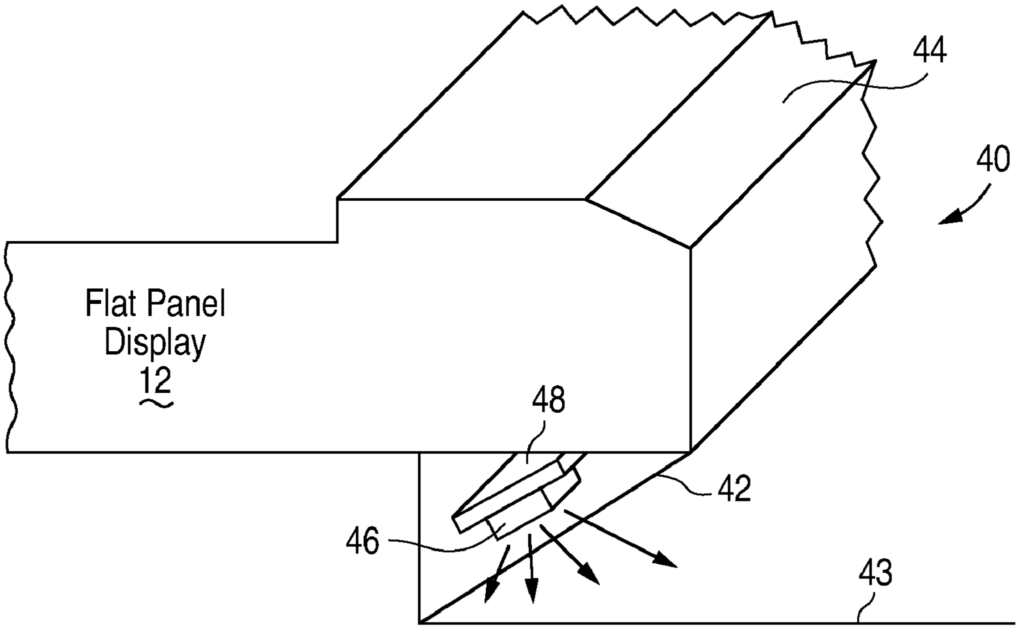
FIG. 3 is a cutaway view of the raised housing showing the downward emitting LED array.

FIG. 3 is a cutaway view of a portion of the raised housing 40. A bottom edge of the housing is angled inward. In one embodiment, the angle is approximately 30 degrees with respect to the front surface 43 of the slant top machine 10. The angled edge is formed of translucent or transparent plastic 42. The upper portion 44 of the raised housing 40 supports the flat panel display 12 or is part of the flat panel display 12.

A linear array of LEDs 46 is mounted on a circuit board 48, which is mounted behind the translucent plastic 42. In one embodiment, the LEDs 46 emit light in a 120 degree Lambertian pattern. In one embodiment, 150 LEDs surround each display 12, 14 in the raised housing. The LEDs are electrically connected in any suitable manner and may be controlled by a microprocessor sending digital signals to a driver. LEDs may be connected in series, in parallel, or a combination of both, or may be individually controlled. In one embodiment, the LEDs 46 are various colors, such as red, green, and blue so that the light may be selectively mixed to create any color. Red, green, blue, orange, and yellow LEDs, as well as individual LED packages containing red, green, and blue LEDs, are readily available. Types of LEDs that may be used are the TOPLED or SIDELED family of LEDs from Osram, Inc., with luminous intensities of approximately 2-20 millicandelas and a flux of about 15-40 millilumens with a forward current of 10 mA. LEDs with other light outputs may also be used. The number of LEDs, the types of LEDs, and the supply current determine the illumination provided by the LEDs.

Figure 4:
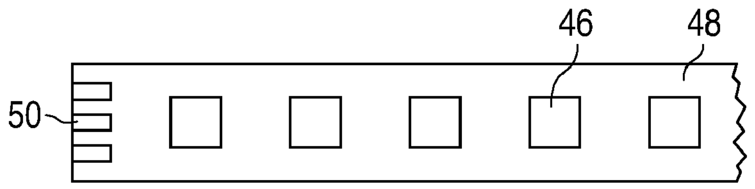
FIG. 4 is a front view of a narrow circuit board containing a linear array of LEDs.

FIG. 4 illustrates a circuit board 48 having a linear array of LEDs 46 mounted on the board and connected to power supply leads 50. There may be separate leads for each color LED. There may be a separate circuit board 48 on each side of the rectangular raised housing 40.

The downward light from the LEDs 46 illuminates the front surface of the gaming machine 10. In one embodiment, the front surface of the gaming machine 10 is brushed stainless steel, which is diffusively reflective. This creates an attractive soft glow by the surface of the machine 10. This glow illuminates the area surrounding machine 10 so the ambient light may be reduced to provide a more pleasant atmosphere for the player. The illumination by the LEDs also illuminates various features on the machine 10, such as printed material, the keypad, control buttons, cushioned railing, and seat.

The display 14 is also mounted in a raised housing 41 identical to that shown in FIG. 3. Raised housing 41 provides further illumination of the surface of the machine 10.

In addition to the LEDs providing illumination of the front surface of the slant top machine or the surrounding area, the light may also be controlled to convey information, such as to convey, by displaying a certain color, that the machine is in the same linked jackpot group as other machines or to convey aspects about the outcomes of games. In one embodiment, the LEDs display different colors or flash when a winning outcome is obtained.

Another advantage of a raised housing that raises the video screen and the LEDs above the front surface is that the screen is optically separated from the rest of the machine and seems to float above the surface. The player can more easily concentrate on the game since other features on the front surface appear to be in the background.

The LEDs 46 need not completely surround the display. For example, the LEDs 46 may only be located along one, two, or three sides of the raised housing.

In an alternative embodiment, an angled mirror is located in the raised housing for reflecting LED light downward toward the front surface of the gaming machine. In such an embodiment, the LEDs can be mounted below the front surface of the machine and direct their light upward for being reflected by the angled mirror. Other optical techniques can be used to illuminate the front surface with LEDs.

The invention can also be implemented on upright gaming machines. The LEDs in the raised housing may completely surround or partially surround any type of gaming display, such as a window revealing motor-driven reels. U.S. Pat. No. 4,695,053, incorporated herein by reference, describes an example of a motor-driven reel-type slot machine. Video slot machines typically present an image of virtual reels spinning and stopping or display card games.

Figure 5:
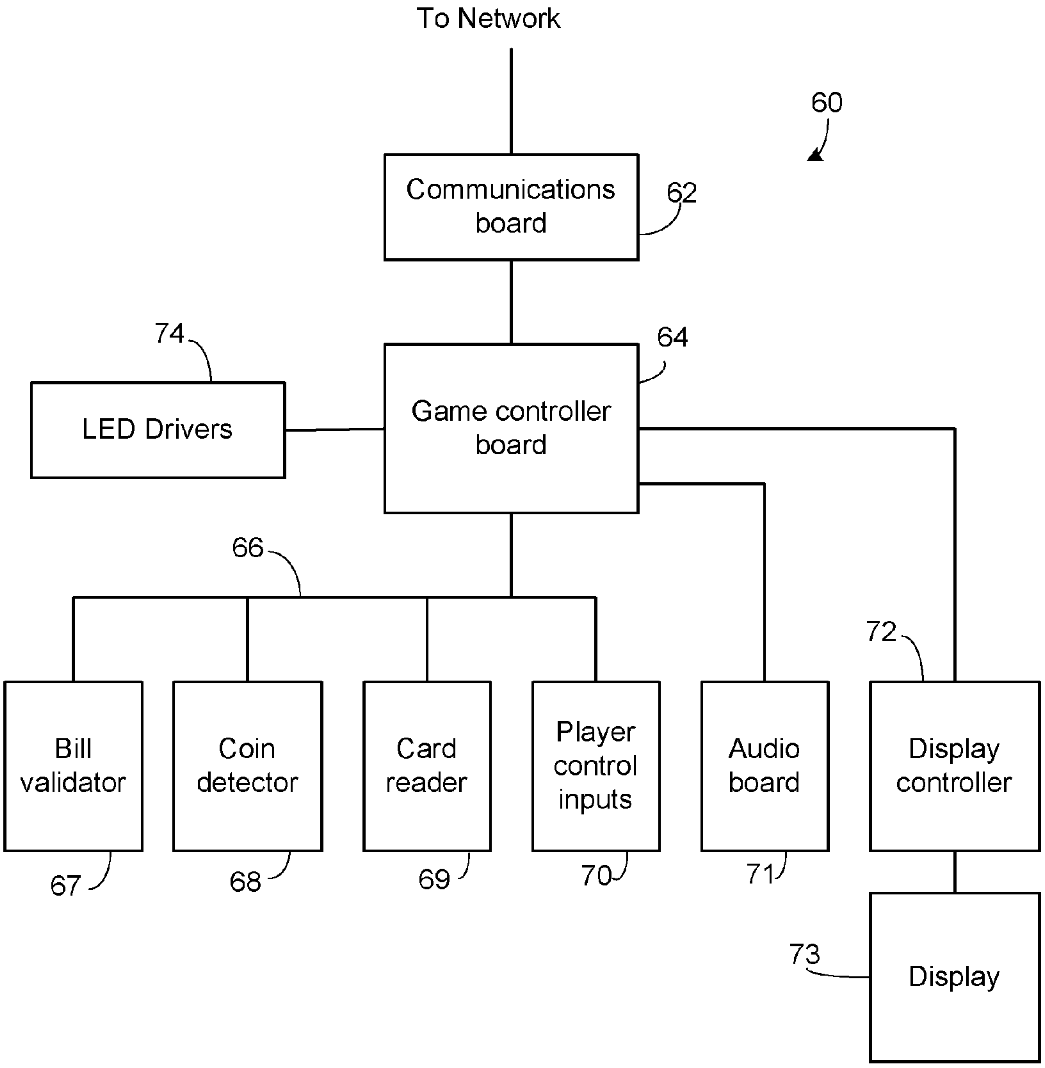
FIG. 5 is a block diagram of various functional units internal to the slot machine of FIG. 1.

FIG. 5 illustrates basic circuit blocks in a suitable gaming machine 60, such as machine 10 in FIG. 1. A communications board 62 may contain conventional circuitry for coupling the gaming machine 60 to a local area network (LAN) or other type of network using Ethernet or any other protocol. The communications board 62 transmits using a wireless transmitter, or it may be directly connected to a network running throughout the casino floor. The communications board 62 basically sets up a communication link with a master controller and buffers data between the network and the game controller board 64. The communications board 62 is used for accounting purposes, linking gaming machines to a common jackpot controller, and other uses.

The game controller board 64 contains memory and a processor for carrying out programs stored in the memory and for providing the information requested by the network. The game controller board 64 primarily carries out the game and payout routines.

Peripheral devices/boards communicate with the game controller board 64 via a bus 66 using, for example, an RS-232 interface. Such peripherals may include a bill validator 67, a coin detector 68, a smart card reader or other type of credit card reader 69, and player control inputs 70 (such as buttons or a touch screen). An audio board 71 converts coded signals into analog signals for driving speakers. A display controller 72, which typically requires a high data transfer rate, converts coded signals to pixel signals for the display 73. Display controller 72 and audio board 71 may be directly connected to parallel ports on the game controller board 64.

LED drivers 74 receive signals from the game controller board 64 for controlling the LEDs 46 and 52 described in FIGS. 3-5. LED drivers 74 may be connected to bus 66.

The electronics on the various boards may be combined onto a single board.

Having described the invention in detail, those skilled in the art will appreciate that, given the present disclosure, modifications may be made to the invention without departing from the spirit and inventive concepts described herein. Therefore, it is not intended that the scope of the invention be limited to the specific embodiments illustrated and described.

What is claimed is:

1. A gaming device comprising:

a display area for displaying a game;

a front surface of the gaming device;

a raised housing at least partially surrounding the display area;

a plurality of LEDs mounted so as to at least partially surround the display area, the raised housing being configured such that light emitted from the LEDs is emitted downward from the raised housing to illuminate at least a portion of the front surface of the gaming device.

2. The device of claim 1 wherein the plurality of LEDs are mounted inside the raised housing.

3. The device of claim 2 wherein the raised housing includes a translucent window for emitting the light from the LEDs.

4. The device of claim 2 wherein the raised housing includes a transparent window for emitting the light from the LEDs.

5. The device of claim 1 wherein the LEDs are mounted in the raised housing on a downward angle with respect to the front surface of the gaming device.

6. The device of claim 1 wherein the front surface of the gaming device is reflective and reflects the light emitted from the LEDs.

7. The device of claim 1 wherein a flat panel display is provided in the display area, a display screen of the flat panel display being raised above the front surface.

8. The device of claim 1 wherein the LEDs are multicolored and controlled by a processor.

9. The device of claim 1 wherein the LEDs completely surround the display area.

10. The device of claim 1 wherein the display area comprises a first display area, the device also comprising a second display area having a second raised housing surrounding the second display area, with LEDs mounted in the second raised housing for illuminating a surrounding area.

11. The device of claim 1 where the front surface of the gaming machine comprises a metal that diffusively reflects light emitted from the LEDs.

12. The device of claim 1 wherein the gaming device is a slant top gaming machine, wherein reflected light from the LEDs illuminates an area in front of the gaming device.

13. A method of illuminating a front surface of a gaming device, the gaming device comprising a display area for displaying a game, the gaming device having a front surface and a raised housing at least partially surrounding the display area, the method comprising:

illuminating a plurality of LEDs mounted so as to at least partially surround the display area, the raised housing being configured such that light emitted from the LEDs is emitted downward from the raised housing to illuminate at least a portion of the front surface of the gaming device.

14. The method of claim 13 wherein the plurality of LEDs are mounted inside the raised housing.

15. The device of claim 13 wherein the raised housing includes a translucent window for emitting the light from the LEDs.

16. The method of claim 13 wherein the raised housing includes a transparent window for emitting the light from the LEDs.

17. The method of claim 13 wherein the LEDs are mounted in the raised housing on a downward angle with respect to the front surface of the gaming device.

18. The method of claim 13 wherein the front surface of the gaming device is reflective, the method further comprising reflecting downward light from the LEDs off the reflective front surface of the gaming device.

19. The method of claim 13 wherein illuminating the LEDs comprises illuminating the LEDs to indicate that the gaming device is part of a linked group of gaming devices.

20. The method of claim 13 wherein illuminating the LEDs comprises illuminating the LEDs in a special manner upon a winning outcome of a game played on the gaming device.

21. The method of claim 13 further comprising energizing a flat panel display provided in the display area to display images, a display screen of the flat panel display being raised above the front surface.

* * * * *